United States Patent
Bender et al.

(10) Patent No.: US 11,093,101 B2
(45) Date of Patent: Aug. 17, 2021

(54) MULTIPLE MONITOR MOUSE MOVEMENT ASSISTANT

(71) Applicant: International Business Machines Corporation, Armonk, NY (US)

(72) Inventors: Michael Bender, Rye Brook, NY (US); Manjari Roy, Danbury, CT (US); Thomas A. Morse, Marble Dale, CT (US); Christopher M. Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 16/008,242

(22) Filed: Jun. 14, 2018

(65) Prior Publication Data

US 2019/0384481 A1 Dec. 19, 2019

(51) Int. Cl.
*G06F 3/0481* (2013.01)
*G06F 3/14* (2006.01)

(52) U.S. Cl.
CPC ........ *G06F 3/04812* (2013.01); *G06F 3/1423* (2013.01)

(58) Field of Classification Search
CPC ............................ G06F 3/04812; G06F 3/1423
See application file for complete search history.

(56) References Cited

U.S. PATENT DOCUMENTS

| | | | | |
|---|---|---|---|---|
| 5,585,821 A * | 12/1996 | Ishikura | ................ | G06F 3/0481 345/1.1 |
| 5,748,189 A * | 5/1998 | Trueblood | .............. | G06F 3/038 715/755 |
| 5,929,840 A * | 7/1999 | Brewer | ............... | G06F 3/04812 345/157 |
| 6,842,795 B2 * | 1/2005 | Keller | ..................... | G06F 3/023 345/156 |
| 7,124,374 B1 * | 10/2006 | Haken | ..................... | G06F 3/038 715/859 |
| 7,800,598 B2 * | 9/2010 | Meyers | ................. | G06F 3/1446 345/204 |
| 8,749,494 B1 * | 6/2014 | Delker | .................. | G06F 3/0488 345/173 |

(Continued)

OTHER PUBLICATIONS

"Control & manage mouse movement between multiple monitors", The Windows Club, last printed Jun. 7, 2018, 3 pages, <http://www.thewindowsclub.com/control-manage-mouse-movement-between-multiple-monitors>.

(Continued)

*Primary Examiner* — Jeremy L Stanley
(74) *Attorney, Agent, or Firm* — Brian D. Welle

(57) ABSTRACT

A method to improve a user's experience operating within a multiple monitor configuration; the method for assigning a first color to a first display screen within a first monitor and a second color to a second display screen within a second monitor; partitioning a first shared border edge of the first display screen; determining that a mouse pointer satisfies a threshold of the first partitioned shared border edge on the first display screen; modifying, in response to the mouse pointer satisfying the threshold, the first partitioned shared border edge with the second color; and highlighting, in response to the mouse pointer moving to the second display screen, a second border boundary of the second monitor display screen.

20 Claims, 7 Drawing Sheets

(56) References Cited

U.S. PATENT DOCUMENTS

| | | | | |
|---|---|---|---|---|
| 9,405,387 B2* | 8/2016 | Chen | | G06F 3/1423 |
| 9,588,604 B2* | 3/2017 | Zheng | | G06F 3/038 |
| 9,804,727 B2* | 10/2017 | Demar | | G06F 3/0481 |
| 2003/0229731 A1* | 12/2003 | Keller | | G06F 3/023 |
| | | | | 710/15 |
| 2004/0113888 A1* | 6/2004 | De Waal | | G06F 3/038 |
| | | | | 345/157 |
| 2006/0033712 A1* | 2/2006 | Baudisch | | G06F 3/038 |
| | | | | 345/157 |
| 2006/0038741 A1* | 2/2006 | Mori | | G06F 3/0481 |
| | | | | 345/1.1 |
| 2006/0143571 A1* | 6/2006 | Chan | | G06F 3/0481 |
| | | | | 715/764 |
| 2009/0243957 A1* | 10/2009 | Ni | | G06F 3/04815 |
| | | | | 345/1.1 |
| 2009/0259963 A1* | 10/2009 | Vyas | | G06F 3/0481 |
| | | | | 715/783 |
| 2011/0083108 A1* | 4/2011 | Klein | | G06F 3/0481 |
| | | | | 715/859 |
| 2012/0146900 A1* | 6/2012 | Ishimoto | | G06F 3/04812 |
| | | | | 345/157 |
| 2013/0132885 A1* | 5/2013 | Maynard | | G06F 3/04883 |
| | | | | 715/777 |
| 2014/0258917 A1* | 9/2014 | Greif | | G06F 3/017 |
| | | | | 715/781 |
| 2015/0042882 A1* | 2/2015 | Park | | H04N 21/44008 |
| | | | | 348/570 |
| 2015/0074564 A1* | 3/2015 | Proctor | | G06F 3/04812 |
| | | | | 715/761 |
| 2015/0189368 A1* | 7/2015 | Lee | | H04N 21/4223 |
| | | | | 725/37 |
| 2015/0293654 A1* | 10/2015 | Cho | | G06F 3/04897 |
| | | | | 715/768 |
| 2016/0062594 A1* | 3/2016 | Niksa | | G06F 3/04812 |
| | | | | 715/858 |
| 2016/0378295 A1* | 12/2016 | Cousins | | G06F 3/04812 |
| | | | | 715/702 |
| 2018/0164952 A1* | 6/2018 | Yao | | G06F 3/04815 |

OTHER PUBLICATIONS

"Mouse clicks across multiple windows", AutoHotkey, Last printed Jun. 7, 2018, 4 pages, <https://autohotkey.com/board/topic/33581-mouse-clicks-across-multiple-windows/>.

"Multiple monitors mouse mapping", tom's Hardware, Last printed Jun. 7, 2018, 3 pages, <http://www.tomshardware.com/forum/id-3005249/multiple-monitors-mouse-mapping.html>.

"Unable to move my mouse to second screen Windows 8", Super User, Last printed Jun. 7, 2018, 4 pages, <https://superuser.com/questions/688762/unable-to-move-my-mouse-to-second-screen-windows-8>.

* cited by examiner

MULTIPLE MONITOR MOUSE MOVEMENT ASSISTANT

BACKGROUND

The present invention relates to front-of-screen technologies, and more specifically, to modifying a user interface in a computing environment to improve user experience.

SUMMARY

Aspects of the present disclosure are directed to a method to improve a user's experience operating within a multiple monitor configuration. The method can comprise assigning a first color to a first display screen within a first monitor and a second color to a second display screen within a second monitor. The method can further comprise partitioning a first shared border edge of the first display screen. The method can additionally comprise determining that a mouse pointer satisfies a threshold of the first partitioned shared border edge on the first display screen. Next, the method can comprise modifying, in response to the mouse pointer satisfying the threshold, the first partitioned shared border edge with the second color. Lastly, the method can comprise highlighting, in response to the mouse pointer moving to the second display screen, a second border boundary of the second monitor display screen.

Aspects of the present disclosure are further directed to a system to improve a user's experience operating within a multiple monitor configuration. The system can comprise a computer environment comprising at least two monitors and a computer readable storage medium configured to store instructions. The system can further comprise a user interface configured to receive input and present output as well as a processor communicatively coupled to the computer readable storage medium and the user interface and having a memory comprising instructions. When executed by the processor, the instructions can be configured to assign a first color to a first display screen within a first monitor and a second color to a second display screen within a second monitor. The instructions can further be configured to partition a first shared border edge of the first display screen. The instructions can additionally be configured to determine that a mouse pointer satisfies a threshold of the first partitioned shared border edge on the first display screen. Next, the instructions can be configured to modify, in response to the mouse pointer satisfying the threshold, the first partitioned shared border edge with the second color. Lastly, the instructions can further be configured to highlight, in response to the mouse pointer moving to the second display screen, a second border boundary of the second monitor display screen.

Aspects of the present disclosure are further directed to a computer program product to improve a user's experience operating within a multiple monitor configuration. The computer program product can comprise a computer readable storage medium having program instructions embodied therewith. The program instructions can cause the processor to assign a first color to a first display screen within a first monitor and a second color to a second display screen within a second monitor. The program instructions can further cause the processor to partition a first shared border edge of the first display screen. The program instructions can additionally cause the processor to determine that a mouse pointer satisfies a threshold of the first partitioned shared border edge on the first display screen. Next, the program instructions can cause the processor to modify, in response to the mouse pointer satisfying the threshold, the first partitioned shared border edge with the second color. Lastly, the program instructions can cause the processor to highlight, in response to the mouse pointer moving to the second display screen, a second border boundary of the second monitor display screen.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
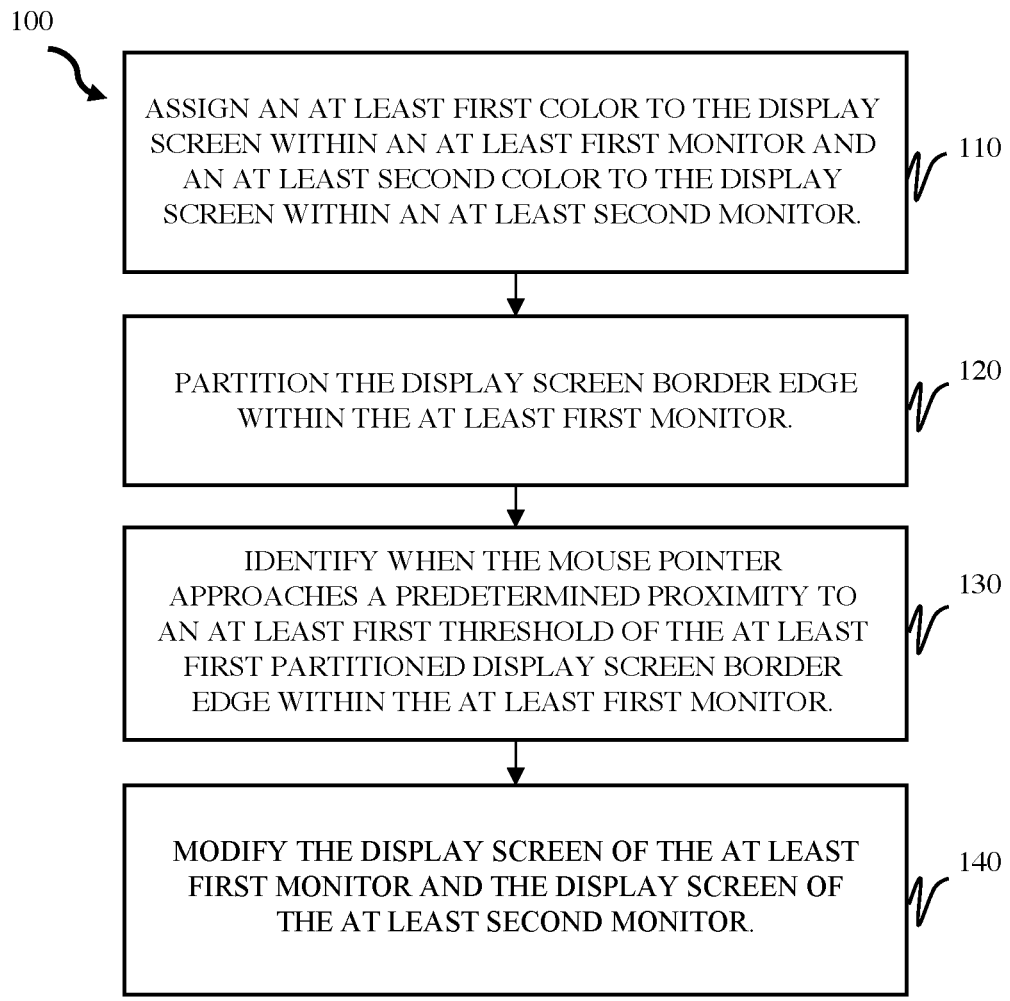
FIG. 1 illustrates a flowchart of an example method for a mouse movement assistant modifying a screen border boundary in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed to front-of-screen technologies, and more specifically, to modifying a user interface in a computing environment to improve the user experience. While the present disclosure is not necessarily limited to such applications, various aspects of the present disclosure may be appreciated through a discussion of various examples using this context.

A computing environment can be the physical configuration of at least two monitors arranged in a horizontal, vertical, or square matrix of monitors connected by at least one adjacent border. Physical monitors can comprise a display screen used to provide visual output from, but not limited to, a computer (e.g., desktop, laptop, etc.), cable box, video camera, and/or other video generating devices having electronics, hardware, software, sensors, actuators, and/or network connectivity.

A physical configuration of at least two monitors arranged in a horizontal, vertical, or square matrix of monitors has applications in many industries to facilitate work-product developments such as, but not limited to, computer engineering (e.g., coding, etc.), business (e.g., finance, trading, etc.), law (e.g., drafting, etc.), transportation (e.g., traffic control, etc.), military (e.g., combat prevalence, etc.), defense (e.g., surveillance, security, etc.), healthcare (e.g., health monitoring, etc.), and so on.

Aspects of the present disclosure relate to a mouse movement assistant visually identifying (hereinafter additionally referred as "visually isolating") partitions of at least one shared display screen border edge accessible by a mouse cursor (hereinafter additionally referred to as "mouse pointer") for seamless monitor crossing. In embodiments, the mouse movement assistant implementation was created to provide assistance to a user to differentiate between partitions of a screen border that allow and do not allow screen-to-screen scrolling. An understanding of some embodiments of the present disclosure may be improved given the context of the mouse movement assistant.

When performing routine activities in computing environments with at least two monitors, a user can face difficulties discerning the path the computer mouse cursor can follow at the intersection of physically adjacent display screens, and more specifically, at the alignment of shared border edges. For example, a mouse cursor may be able to move between a first shared border edge between a first couple of adjacent display screens, but the mouse cursor may not be able to move between a second shared border edge between a second pair of adjacent display screens based on the interconnections between the matrix of display screens. By assigning at least one color to at least one screen border boundary that bridges the computing environment, the mouse movement assistant enables the user of at least two monitors, to quickly and accurately identify and configure the appropriate computing environment.

Aspects of the present disclosure visually differentiate at least one partition (e.g., location) on at least one screen border boundary comprised in at least one monitor of the at least two monitor computer environments. The at least one partition can be configured by at least one color. The at least one screen border boundary can be calculated based on a series of addressable pixels for each monitor. An understanding of some embodiments of the present disclosure may be improved given the context of support crossing and highlight crossing.

In conventional arts, at least two monitors comprising adjacent display screen border boundaries (e.g., shared border edge) can be physically aligned to enable screen-to-screen mouse pointer crossing. Aspects of the present disclosure propose to visually identify with at least one color, accessible partitions of at least two adjacent, physically aligned and/or unaligned screen border boundaries comprised on at least two separate monitors to enable screen-to-screen mouse pointer crossing. Aspects of the present disclosure further propose to visually identify, for a configurable period of time (e.g., less than 1 second, less than 5 seconds, less than 10 seconds, permanently, etc.), when a computer mouse pointer crosses at least a first screen border boundary so that the computer mouse pointer is easily identifiable after an idle period of computing operations (e.g., typing, scrolling, etc.).

Aspects of the present disclosure realize numerous advantages. When performing routine activities in a computing environment with at least two physically aligned and/or unaligned monitors, it can be difficult for a user to discern where the screen border boundaries align between the at least two monitors. More specifically, it can be difficult for a user to discern where the at least two monitor screens (e.g., digital display on the user interface) meet, and which borders align (e.g., between at least two monitors of two difference dimensions). Furthermore, in extensions of a virtual desktop (e.g., laptop with at least on monitor screen, etc.) it can be difficult to discern which partitions of a display screen border is permitted for screen-to-screen crossing. By visually isolating at least one partitioned and shared display screen border edge with at least a first color representing permitted screen-to-screen crossing, aspects of the present disclosure enable quick and accurate identification of accessible partitions with at least one color for seamless screen crossing.

As another example advantage, aspects of the present disclosure enhance a user's experience operating the computing environment. By assigning at least one separate color to at least one screen border boundary of at least a first monitor that bridges the computing environment, aspects of the present disclosure enable the user of at least two monitors, assembled in a matrix of monitors, to accurately identify the mouse cursor location and available paths of movement in the computing environment. Thus, aspects of the present disclosure improve a user's experience operating a matrix of monitors.

Thus, aspects of the present disclosure are necessarily rooted in computer technology at least insofar as aspects of the present disclosure visually isolate permitted partitions of screen-to-screen crossing by modifying the screen border boundary of at least a first monitor in the computing environment. Aspects of the present disclosure exhibit at least improved detection (e.g., permitted partitions), improved accuracy (e.g., screen border crossing), and improved computational performance by reducing the human error associated with moving a mouse pointer between multiple monitors in a matrix of monitors.

The aforementioned advantages are example advantages and embodiments exist that can contain all, some, or none of the aforementioned advantages while remaining within the spirit and scope of the present disclosure.

Referring now to figures, FIG. 1 illustrates an example method 100 for a mouse movement assistant modifying a screen border boundary in accordance with some embodiments of the present disclosure. The method 100 can be performed by, for example, one or more processors, a mouse movement assistant (e.g., mouse movement assistant 700 of FIG. 7), or a different configuration of software. For clarity, the method 100 will be described as being performed by the mouse movement assistant in a computing environment comprising at least two monitors (e.g., computing environment 600 of FIG. 6), however, aspects of the present disclosure can be performed by other software components or combinations of software components. It is to be understood that, in embodiments, various colors are presented by way of example and alternative colors, patterns, and/or graphics are possible in other embodiment of the present disclosure. Further, the physical locations of the at least two monitors need not map to the logical mapping of the monitors in the computing environment.

In embodiments, the at least first monitor can be in a horizontal configuration with the at least second monitor, with the right-most border of the at least first monitor physically adjacent to the left-most border of the at least second monitor to form a shared border edge. Alternatively, in some embodiments, the at least first monitor can be in a vertical configuration with the at least second monitor, with the bottom-most border of the at least first monitor physically adjacent to the top-most border of the at least second monitor to form a shared border edge. For clarity, the method 100 will be discussed as being performed in the horizontal configuration.

In embodiments, the mouse movement assistant is a standard application of a machine operated identifier which establishes addressable pixels for a display screen to improve a user's experience when working with at least two monitors in a computing environment.

In operation 110, the mouse movement assistant assigns an at least first color to the display screen within an at least first monitor comprised in the computing environment. In embodiments, the computing environment can additionally comprise an at least second monitor, such that, at least one border edge of the at least second monitor (e.g., the left-most border) is shared and physically adjacent to the at least one border edge (e.g., the right-most border) of the at least first monitor. By physically configuring the at least first monitor and at least second monitor to share an adjacent border edge, the display screen within the at least second monitor can create an extension of a user interface for the display screen of the at least first monitor. In embodiments, a border edge of the display screen can comprise the left-most, right-most, top-most, and/or bottom-most screen border boundary of a monitor. The mouse movement assistant can assign an at least second color to the display screen within the at least second monitor. For example, the display screen of the at least first monitor can be assigned blue and the display screen of the at least second monitor can be assigned yellow.

In embodiments, each individual color assigned within the plurality of assigned colors, correlates to a specific display screen within a specific monitor comprised in the computing environment. However, in some embodiments, the at least first color is not the same as the at least second color when the at least first monitor is adjacent, by at least one border edge, to the at least second monitor. If, for example, a third monitor is adjacent to the first monitor (assigned blue) by a border edge not shared with the second monitor, and the second monitor (assigned yellow) and third monitor are not adjacent, then a display screen of the at least third monitor cannot be assigned blue.

It is to be understood in embodiments that each monitor comprised in the computing environment has a rectangular configuration, however, embodiments are not limited to such and are only presented for means of example. In operation 120, the mouse movement assistant partitions the display screen at the shared border edge within the at least first monitor. In embodiments, an at least first border edge within the display screen of the at least first monitor, physically adjacent to an at least first border edge within the display screen of the at least second monitor, is partitioned. The partitioned at least first border edge within the at least first monitor can represent a vertical threshold along the physically adjacent border edges comprised on the at least first monitor indicating the area of permitted mouse pointer crossing between the at least first monitor and at least second monitor.

In embodiments, the border edge of each display screen can comprise the outermost edge of pixels and each partitioned shared border edge can comprise an array of pixels along one defined border edge of the monitor. For example, the mouse movement assistant can partition the shared border edge of the display screen along the right-most edge within the at least first monitor. Simultaneously, the shared border of the left-most edge of the display screen within the at least second monitor can be partitioned. The length of each partitioned display screen border can be identified by the operating system and is determined based upon the detected portion of display screen overlap between the at least first monitor and at least second monitor. In embodiments, each partitioned shared border edge need not be equivalent in length and/or height to at least one additional partitioned shared border edge within the same display screen or computing environment.

In embodiments, the plurality of remaining unshared display screen border edges within the first monitor (e.g., the bottom-most, left-most, and top-most screen border) are connected into an at least first partial display screen border boundary and represent a separate threshold where mouse pointer crossing from the display screen of the at least first monitor to the display screen of the at least second monitor is prohibited.

In embodiments, the computing environment can operate using an operating system with the mouse pointer performing, in response to a user movement (e.g., moving a corresponding mouse), an action at a specific location on the monitor. In operation 130, using the capabilities of the existing operating system, the mouse movement assistant can identify when the user moves (e.g., approaches) the mouse pointer, comprised on the display screen within the at least first monitor, within a predetermined proximity to the at least first threshold of the partitioned display screen shared border edge. The predetermined proximity can be a configurable distance of pixels (e.g., 10 pixel, 100 pixels, any number between 5 and 500 pixels, or a different number), as set by the user, from at least one display screen border edge.

In operation 140, the mouse movement assistant can modify the display screen of the at least first monitor and the display screen of the at least second monitor. Modifying can comprise visually isolating the at least first partitioned display screen shared border edge for user support, such that a user can visually identify, on the display screen of the at least first monitor, the at least first partition where mouse pointer crossing to the at least second monitor is permitted. Operation 140 can be explained in more detail with respect to FIG. 2.

FIG. 1 is intended to represent illustrative operations of an example method for a mouse movement assistant modifying a screen border boundary in accordance with some embodiments of the present disclosure. In some embodiments, however, individual operations can have greater or lesser complexity than shown in FIG. 1, and operations in addition to (or in substitution of) those shown in FIG. 1 can be present. Furthermore, in some embodiments, various operations illustrated in FIG. 1 can have greater, lesser, or different functionality than shown in FIG. 1. Furthermore, in some embodiments, various operations illustrated in FIG. 1 can occur in different orders, if they occur at all.

Figure 2:
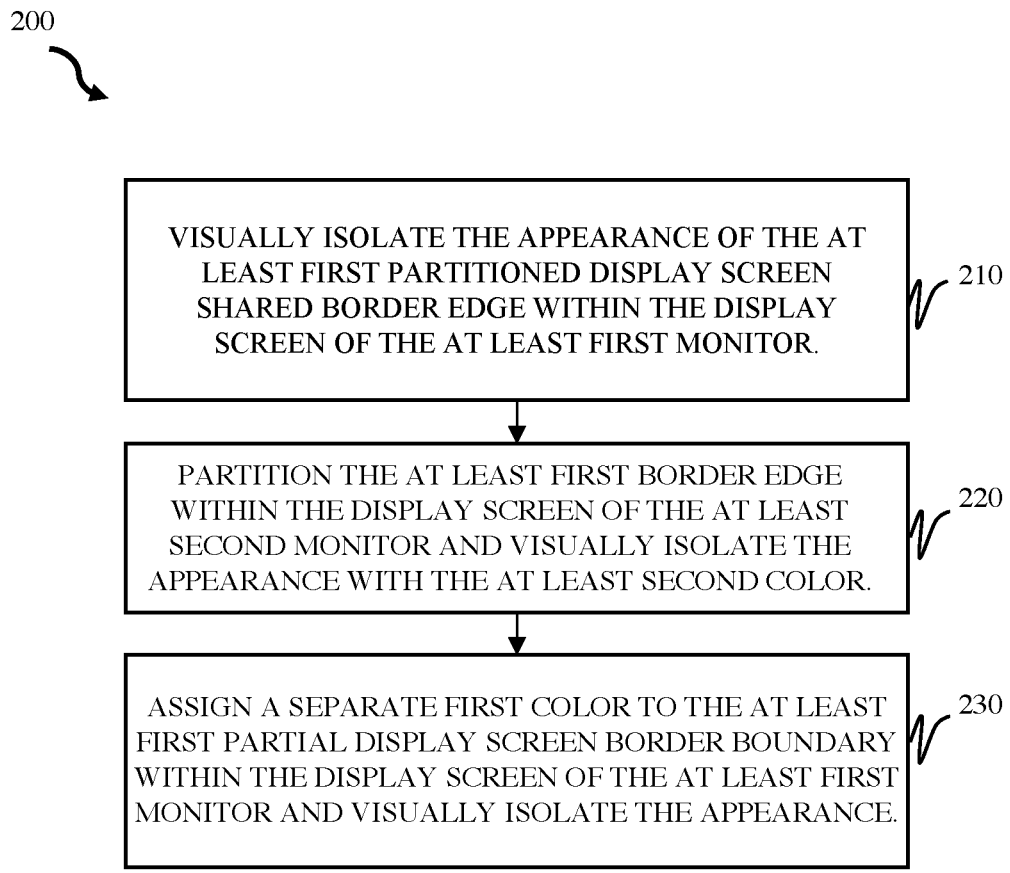
FIG. 2 illustrates a flowchart of an example method for mouse pointer support crossing in accordance with some embodiments of the present disclosure.

FIG. 2 illustrates an example method 200 for mouse pointer support crossing in accordance with some embodiments of the present disclosure. The method 200 can be performed by, for example, one or more processors, a mouse movement assistant (e.g., mouse movement assistant 700 of FIG. 7), or a different configuration of software. For clarity, the method 200 will be described as being performed by the mouse movement assistant in a computing environment (e.g., computing environment 600 of FIG. 6) comprising at least two monitors arranged in horizontal, vertical, or square matrix configuration, however, aspects of the present disclosure can be performed by other software components or combinations of software components. It is to be understood that the various colors discussed in the method 200 are presented by way of example and alternative colors, patterns, and/or graphics are possible. The method 200 can comprise operations as part of, in addition to, or in lieu of operation 140 of FIG. 1.

In operation 210, the display of the at least first partitioned display screen border edge is modified in response to the occurrence of the mouse pointer approaching the at least first threshold of the at least first monitor. The mouse movement assistant can visually isolate the appearance of the at least first partitioned display screen shared border edge such that the shared border edge within the display screen of the at least first monitor is visually distinguishable with the at least second assigned color of the at least second monitor as the mouse pointer approaches the at least first threshold of the at least first monitor.

For example, when the mouse movement assistant identifies the mouse pointer is within 0.25 inches from the right-most display screen border edge of the at least first monitor, the at least first partitioned display screen border edge displays a yellow at least first partitioned display screen border edge within the parameters of the configurable display screen border distance.

In operation 220, the at least first shared border edge within the display screen of the at least second monitor, physically adjacent to the at least first border edge within the display screen of the at least first monitor, is partitioned. The partitioned at least first border edge within the at least second monitor can be visually isolated in response to modifying the at least first partitioned display screen border edge of the at least first monitor such that the at least first partitioned display screen border edge within the display screen of the at least second monitor is visually distinguishable with the at least second assigned color of the at least second monitor as the at least first partitioned display screen border edge of the at least first monitor illuminates.

For example, when the mouse movement assistant visually isolates and distinguishes a yellow at least first partitioned display screen border edge, the at least first border edge within the display screen of the at least second monitor (physically adjacent to the at least first border edge within the display screen of the at least first monitor) is visually isolated with yellow.

In operation 230, the at least first partial display screen border boundary within the display screen of the at least first monitor is assigned a separate first color and visually isolated from the at least first partitioned display screen shared border edge. The at least first partial display screen border boundary within the at least first monitor is visually isolated in response to modifying the at least first partitioned display screen border edge of the at least first monitor such that the at least first partial screen border boundary within the display screen of the at least first monitor is distinguishable with the separate first color as the at least first partitioned display screen border edge of the at least first monitor and the at least first partitioned display screen border edge of the at least second monitor are visually isolated.

For example, in response to both the right-most border of the display screen in the at least first monitor and the left-most border of the display screen in the at least second monitor displaying a yellow border, the bottom-most, left-most, and top-most un-partitioned remaining border within the display screen of the at least first monitor can display red, indicating prohibited mouse pointer screen crossing to the at least first screen.

Depending on the orientation and origin point of the mouse pointer in the computing environment, the location of the at least first partitioned display screen border within either the at least first monitor and/or at least second monitor can change. In some embodiments, for example, the mouse movement assistant can identify when the user moves the mouse pointer, comprised on the display screen of the at least second monitor, within a predetermined proximity to an at least second threshold (e.g., 10 pixels, 100 pixels, between 5 pixels and 500 pixels, or a different number of pixels, dimension, or other measurement) permitting mouse pointer crossing from the display screen of the at least second monitor the display screen of the at least first monitor. In response to identification, the at least-first partitioned display screen border within the display screen of the at least second monitor and the at least first partitioned display screen border with the display screen of the at least first monitor can be visually isolated to display blue. Simultaneously, the bottom-most, right-most, and top-most display screen border edge within the display of the at least second monitor can display red.

FIG. 2 is intended to represent illustrative operations of an example method for mouse pointer support crossing in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3:
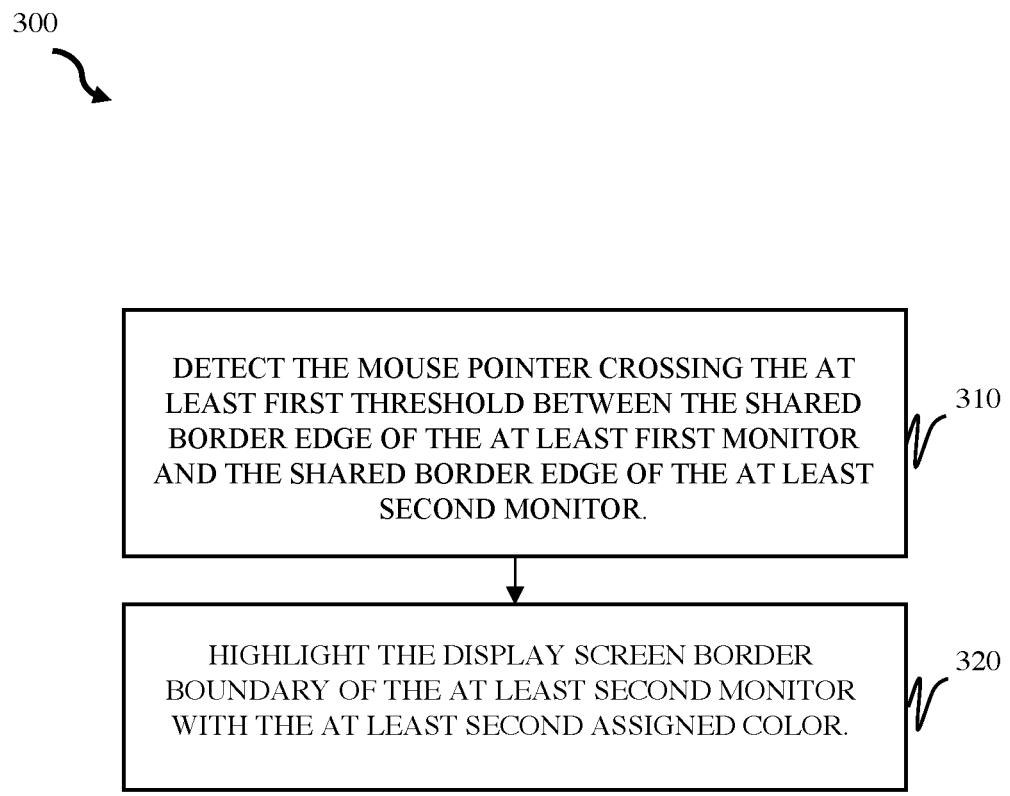
FIG. 3 illustrates a flowchart of an example method for mouse pointer highlight crossing in accordance with some embodiments of the present disclosure.

FIG. 3 illustrates an example method 300 for mouse pointer highlight crossing in accordance with some embodiments of the present disclosure. The method 300 can be performed by, for example, one or more processors, a mouse movement assistant (e.g., mouse movement assistant 700 of FIG. 7), or a different configuration of software. For clarity, the method 300 will be described as being performed by the mouse movement assistant in a computing environment (e.g., computing environment 600 of FIG. 6) comprising at least two monitors arranged in a horizontal configuration, however, aspects of the present disclosure can be performed by other software components or combinations of software components. It is to be understood in embodiments, the various colors are presented by way of example and are not limited to such. The method 300 can comprise operations in addition to the method 200 of FIG. 2.

In operation 310, the mouse movement assistant can detect that the mouse pointer has entered the display screen of the at least second monitor and subsequently crossed the at least first threshold between the shared border edge of the at least first monitor and the at least second monitor.

In operation 320, in response to the mouse pointer crossing the at least first threshold between the shared border edge of the at least first monitor and at least second monitor (e.g., entering the display screen of the at least second monitor), the display screen border boundary within the display screen of the at least second monitor can be highlighted to display the at least second assigned color for a configurable amount of time (e.g., less than 1 second, less than 5 seconds, less than 10 seconds, permanently, etc.).

For example, in embodiments, when the mouse pointer, crosses the distinguishable yellow partitioned display screen border edge of the at least first monitor and the distinguishable yellow partitioned display screen border edge of the at least second monitor, the border surrounding the display screen of the at least second monitor can be highlighted yellow.

In embodiments, the highlighted yellow border is configured to be displayed for a predetermined time (e.g., 2 seconds) as determined by the user. Highlighting the border for the predetermined time serves to enable the user to easily identify the location of the cursor during period of user inactivity and visually display which monitor the cursor has moved to.

FIG. 3 is intended to represent illustrative operations of an example method for mouse pointer highlight crossing in accordance with some embodiments of the present disclosure. In some embodiments, however, individual operations can have greater or lesser complexity than shown in FIG. 3, and operations in addition to (or in substitution of) those shown in FIG. 3 can be present. Furthermore, in some embodiments, various operations illustrated in FIG. 3 can have greater, lesser, or different functionality than shown in FIG. 3. Furthermore, in some embodiments, various operations illustrated in FIG. 3 can occur in different orders, if they occur at all.

Figure 4A:
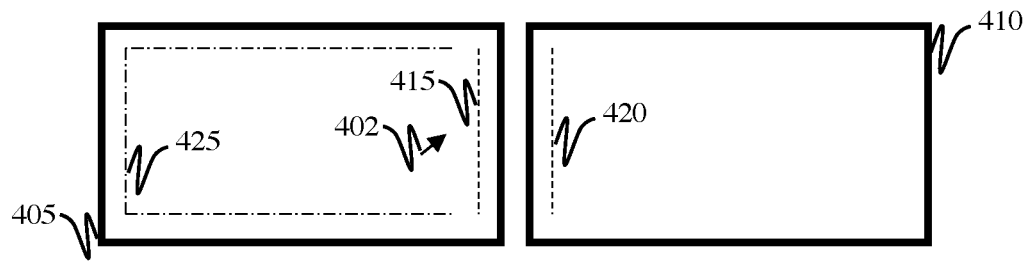
FIGS. 4A, 4B, and 4C illustrate diagrammatic depictions of example mouse pointer support crossing displays in accordance with some embodiments of the present disclosure.
Figure 4B:
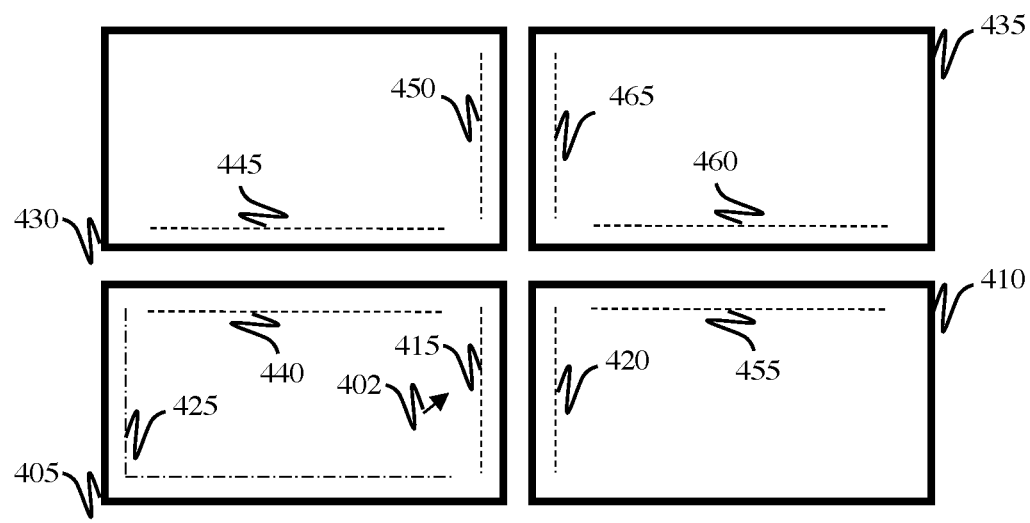
Figure 4C:
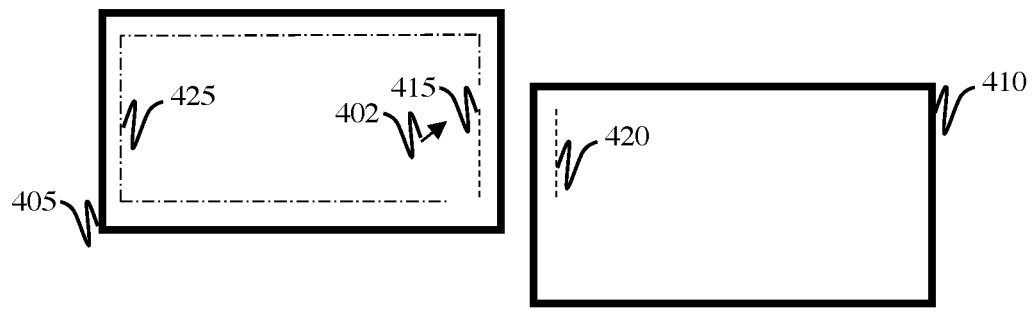

FIGS. 4A, 4B, and 4C illustrate diagrammatic depictions for visually isolating the display of the at least first partitioned display screen border edge for screen-to-screen crossing, in accordance with embodiments of the present disclosure. In some embodiments, FIGS. 4A, 4B, and 4C illustrate diagrammatic depictions consistent with the methods described in FIG. 1 and FIG. 2. In some embodiments, FIGS. 4A, 4B, and 4C are implemented by a mouse movement assistant (e.g., mouse movement assistant 700 of FIG. 7).

As depicted in FIG. 4A, support crossing for a mouse pointer 402 operating within the display screen of an at least first monitor 405 and the display screen of an at least second monitor 410 is shown. In embodiments, the at least first monitor 405 and at least second monitor 410 comprise equivalent dimensions and are symmetrically aligned such that overlap along the adjacently shared border edge of the right-most border edge of the at least first monitor 405 is maximized with (e.g., approximately equal to, dimensions within 5% of one another, etc.) the adjacently shared border edge of the left-most border edge of the at least second monitor 410. Mouse pointer 402 can operate in response to a user action (e.g., moving a corresponding mouse) and have an origin position comprised within the display screen of the at least first monitor 405.

In response to the mouse movement assistant identifying mouse pointer 402 approaching the right-most edge's predetermined border crossing threshold (not pictured) of the at least first monitor 405, a first visually isolated partitioned display screen border edge 415 can appear within the display of the at least first monitor 405. The appearance of the first visually isolated partitioned display screen border edge 415 can reflect the color assigned to the at least second monitor 410 (similar to operation 110 of FIG. 1). For illustrative purposes, the border edge 415 is represented with a dashed line (-), however, it is to be understood that at least one specific color can be used to visually isolate border edge 415.

As the first dashed visually isolated partitioned display screen border edge 415 appears, a separate and identical visually isolated partitioned display screen border edge 420 is displayed along the left-most edge of the display screen within the at least second monitor 410. For illustrative purposes, border edge 420 is represented with a dashed line, identical to the appearance of border edge 415, however, it is to be understood that at least one specific color can be used to visually isolate border edge 420.

The remaining unshared and un-partitioned edges within the display screen of the at least first monitor 405 collectively form an at least first partial display screen border boundary 425. As border edge 415 and border edge 420 appear within the display of the at least first monitor 405 and the display of the at least second monitor 410, the appearance of the at least first partial display screen border boundary 425 can be assigned a color, separate from the assigned color of the at least first monitor 405 and at least second monitor 410 (e.g., operation 110 of FIG. 1), and visually isolated. For illustrative purposes, the at least first partial screen border boundary 425 is visually isolated with an alternating dash and period (-·-) line, however, it is to be understood that at least one specific color, separate for the specific color of border edge 415 and border edge 420, is used to visually isolate border boundary 425.

As depicted in FIG. 4B, support crossing for a mouse pointer operating within the display screen of at least two monitors within a matrix configuration is shown. In embodiments, the at least first monitor 405, the least second monitor 410, an at least third monitor 430, and an at least fourth monitor 435 comprised of equivalent dimensions, are symmetrically aligned such that overlap along the adjacently shared border edge of the right-most border edge of the at least first monitor 405 is maximized with the adjacently shared border edge of the left-most border edge of the at least second monitor 410, overlap along the adjacently shared border edge of the top-most border edge of the at least first monitor 405 is maximized with the adjacently shared border edge of the bottom-most border edge of the at least third monitor 430, overlap along the adjacently shared border edge of the top-most border edge of the at least second monitor 410 is maximized with the adjacently shared border edge of the bottom-most border edge of the at least fourth monitor 435, and overlap along the adjacently shared border edge of the right-most border edge of the at least third monitor 430 is maximized with the adjacently shared border edge of the left-most border edge of the at least fourth monitor 435. A mouse pointer 402 can operate in response to a user action (e.g., moving a corresponding mouse) and have an origin position comprised within the display screen of the at least first monitor 405.

In response to the mouse movement assistant identifying mouse pointer 402 approaching the right-most edge's predetermined border crossing threshold (not pictured) of the at least first monitor 405, the border edge 415 and a second visually isolated partitioned display screen border edge 440 can appear within the display of the at least first monitor 405. The appearance of the second visually isolated partitioned display screen border edge 440 can reflect the color assigned to the at least third monitor 430 (similar to operation 110 of FIG. 1). For illustrative purposes, the third visually isolated partitioned display screen border 440 is represented with a dashed line (-), however, it is to be understood that at least one specific color is used to visually isolate border edge 440 and the at least one specific color cannot be identical to the at least one specific color assigned to the at least second monitor 410.

As border edge 440 appears, a separate and identical visually isolated partitioned display screen border edge 445 is displayed along the bottom-most edge of the display screen with the at least third monitor 430. For illustrative purposes, border edge 445 is represented with a dashed line, identical to the appearance of border edge 440, however, it is to be understood that at least one specific color is used to visually isolate border edge 445, and the at least one specific color cannot be identical to the at least one specific color assigned to the at least second monitor 410.

Similarly, in some embodiments for example, if the mouse pointer 402 has an origin position comprised within the display screen of the at least third monitor 430 and the mouse movement assistant identifies the mouse pointer 402 approaching the bottom-most edge's predetermined border crossing threshold (not pictured), the border edge 445 and a second visually isolated partitioned display screen border edge 450 can appear within the display of the at least third monitor 430. The appearance of the second visually isolated partitioned display screen border edge 450 can reflect the color assigned to the at least fourth monitor 435. For illustrative purposes, border edge 450 is represented with a dashed line, identical to the appearance of border edge 445, however, it is to be understood that at least one specific color assigned to the at least fourth monitor 435 is used to visually isolate border edge 450, and the at least one specific color cannot be identical to the at least one specific color assigned to the at least third monitor 430.

Similarly, in some embodiments for example, if the mouse pointer 402 has an origin position comprised within the display screen of the at least second monitor 410 and the mouse movement assistant identifies the mouse pointer 402 approaching the top-most edge's predetermined border crossing threshold (not pictured), the border edge 420 and a second visually isolated partitioned display screen border edge 455 can appear within the display of the at least second monitor 410. The appearance of the second visually isolated partitioned display screen border edge 455 can reflect the color assigned to the at least fourth monitor 435 and further be identical to the border edge 450. For illustrative purposes, border edge 455 is represented with a dashed line, identical to the appearance of border edge 420, however, it is to be understood that at least one specific color assigned to the at least fourth monitor 435 is used to visually isolate border edge 450, and the at least one specific color cannot be identical to the at least one specific color assigned to the at least second monitor 410.

Similarly, in some embodiments for example, if the mouse pointer 402 has an origin position comprised within the display screen of the at least fourth monitor 435 and the mouse movement assistant identifies the mouse pointer 402 approaching the left-most edge's predetermined border crossing threshold (not pictured), a first visually isolated partitioned display screen border edge 460 and a second visually isolated partitioned display screen border edge 465 can appear within the display of the at least fourth monitor 435. The appearance of the border edge 460 can reflect the color assigned to the at least second monitor 410 and the border edge 465 can reflect the color assigned to the at least third monitor 430. For illustrative purposes, border edge 460 and border edge 465 are represented with a dashed line, however, it is to be understood that at least one specific color assigned to the at least second monitor 410 is used to visually isolate border edge 460, and at least one specific color assigned to the at least third monitor 430 is used to visually isolate border edge 465. In some embodiments, the at least one specific color cannot be identical to the at least one specific color assigned to the at least fourth monitor 435.

The remaining unshared and un-partitioned edges within the display screen of the at least first monitor 405 collectively form an at least first partial display screen border boundary 425. As border edge 415 and border edge 420 appear within the display of the at least first monitor 405 and the display of the at least second monitor 410, the appearance of the at least first partial display screen border boundary 425 can be assigned a color, separate from the assigned color of the at least first monitor 405 and at least second monitor 410 (e.g., operation 110 of FIG. 1), and visually isolated. For illustrative purposes, the at least first partial display screen border boundary 425 is visually isolated with an alternating dash and period (-··-) line, however, it is to be understood that at least one specific color, separate for the specific color of border edge 415 and border edge 420, is used to visually isolate border boundary 425.

As depicted in FIG. 4C, support crossing for a mouse pointer operating within the display screen of an at least first monitor 405 and the display screen of an at least second monitor 410 is indicated. In embodiments, the at least first monitor 405 and at least second monitor 410 comprise equivalent dimensions but are asymmetrically aligned such that overlap along the adjacently shared border edge of the right-most border edge of the at least first monitor 405 is not maximized with the adjacently shared border edge of the left-most border edge of the at least second monitor 410. An un-maximized border edge can indicate a partitioned display screen border edge smaller than the dimensional height of the display screen. A mouse pointer 402 can operate in response to a user action (e.g., moving a corresponding mouse) and have an origin position comprised within the display screen of the at least first monitor 405.

In response to the mouse movement assistant identifying mouse pointer 402 approaching the right-most edge's predetermined border crossing threshold (not pictured) of the at least first monitor 405, a first un-maximized visually isolated partitioned display screen border edge 415 can appear within the right-most bottom display of the at least first monitor 405. The appearance of the first visually isolated partitioned display screen border edge 415 can reflect the color assigned to the at least second monitor 410 (similar to operation 110 of FIG. 1). For illustrative purposes, the border edge 415 is represented with a dashed line (-), however, it is to be understood that at least one specific color is used to visually isolate border edge 415.

As the border edge 415 appears, a separate, un-maximized, and identical visually isolated partitioned display screen border edge 420 is displayed along the upper left-most edge of the display screen within the at least second monitor 410. For illustrative purposes, border edge 420 is represented with a dashed line, identical to the appearance of border edge 415, however, it is to be understood that at least one specific color is used to visually isolate border edge 420. As shown, border edge 415 and border edge 420 each have a length less than a height of the first monitor 405 and a height of the second monitor 410.

The remaining unshared and un-partitioned edges within the display screen of the at least first monitor 405, including the right-most un-partitioned upper border edge collectively form an at least first partial display screen border boundary 425. As border edge 415 and border edge 420 appear within the display of the at least first monitor 405 and the display of the at least second monitor 410, the appearance of the at least first partial display screen border boundary 425 can be assigned a color, separate from the assigned color of the at least first monitor 405 and at least second monitor 410 (e.g., operation 110 of FIG. 1), and visually isolated. For illustrative purposes, the at least first partial display screen border boundary 425 is visually isolated with an alternating dash and period (-··-) line, however, it is to be understood that at least one specific color, separate for the specific color of border edge 415 and border edge 420, is used to visually isolate border boundary 425.

FIGS. 4A, 4B, and 4C are intended to represent illustrative diagrammatic depictions of example mouse pointer support crossing displays with some embodiments of the present disclosure. In some embodiments, however, individual components can have greater or lesser complexity than shown in FIGS. 4A, 4B, and 4C, and components in addition to (or in substitution of) those shown in FIGS. 4A, 4B, and 4C can be present. Furthermore, in some embodiments, various components illustrated in FIGS. 4A, 4B, and 4C can have greater, lesser, or different functionality than shown in FIGS. 4A, 4B, and 4C. Furthermore, in some embodiments, various components illustrated in FIGS. 4A, 4B, and 4C can occur in different orders, if they occur at all.

Figure 5:
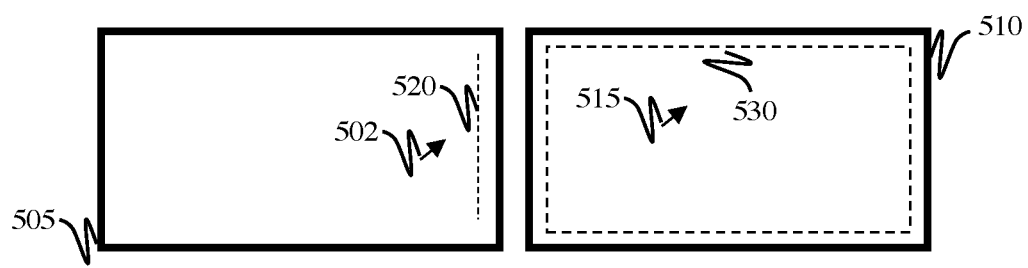
FIG. 5 illustrates a diagrammatic depiction of an example mouse pointer highlight crossing display in accordance with some embodiments of the present disclosure.

FIG. 5 illustrates a diagrammatic depiction for highlighting the border of a display when screen-to-screen crossing occurs, in accordance with embodiments of the present disclosure. In some embodiments, FIG. 5 is implemented by a mouse movement assistant (e.g., mouse movement assistant 700 of FIG. 7). In some embodiments, FIG. 5 depicts a diagram consistent with the method 300 of FIG. 3.

As depicted in FIG. 5, highlight crossing for a mouse pointer operating within the display screen of an at least first monitor 505 and the display screen of an at least second monitor 510 is indicated. In embodiments, the at least first monitor 505 and at least second monitor 510 comprise equivalent dimensions and are symmetrically aligned such that overlap along the adjacently shared border edge of the right-most border edge of the at least first monitor 505 is maximized with the adjacently shared border edge of the left-most border edge of the at least second monitor 510. A mouse pointer 502 can operate in response to a user action (e.g., moving a corresponding mouse) and have an origin position comprised within the display screen of the at least first monitor 505.

Similar to components comprised in FIGS. 4A, 4B, and 4C, a first visually isolated partitioned display screen border edge 520 can appear within the display of the at least first monitor 505 when the mouse pointer 502 approaches the right-most edge's predetermined border crossing threshold (not pictured) of the at least first monitor 505.

In response to the mouse pointer 502 crossing the right-most edge's predetermined border crossing threshold of the at least first monitor 505 and entering the display screen at mouse pointer position 515, within the at least second monitor 510, the border 530 of the display screen within the at least second monitor 510 can be highlighted for user viewing convenience.

For illustrative purposes, the border 530 is represented with a dashed line, identical to the appearance of border edge 520, however, it is to be understood that the border 530 is highlighted with the at least one specific color assigned to the at least second monitor 510 and that the at least one specific color cannot be identical to the at least one specific color assigned to the at least first monitor 505 and/or connecting monitor thereof.

FIG. 5 is intended to represent illustrative a diagrammatic depiction of an example mouse pointer highlight crossing display with some embodiments of the present disclosure. In some embodiments, however, individual components can have greater or lesser complexity than shown in FIG. 5, and components in addition to (or in substitution of) those shown in FIG. 5 can be present. Furthermore, in some embodiments, various components illustrated in FIG. 5 can have greater, lesser, or different functionality than shown in FIG. 5. Furthermore, in some embodiments, various components illustrated in FIG. 5 can occur in different orders, if they occur at all.

Figure 6:
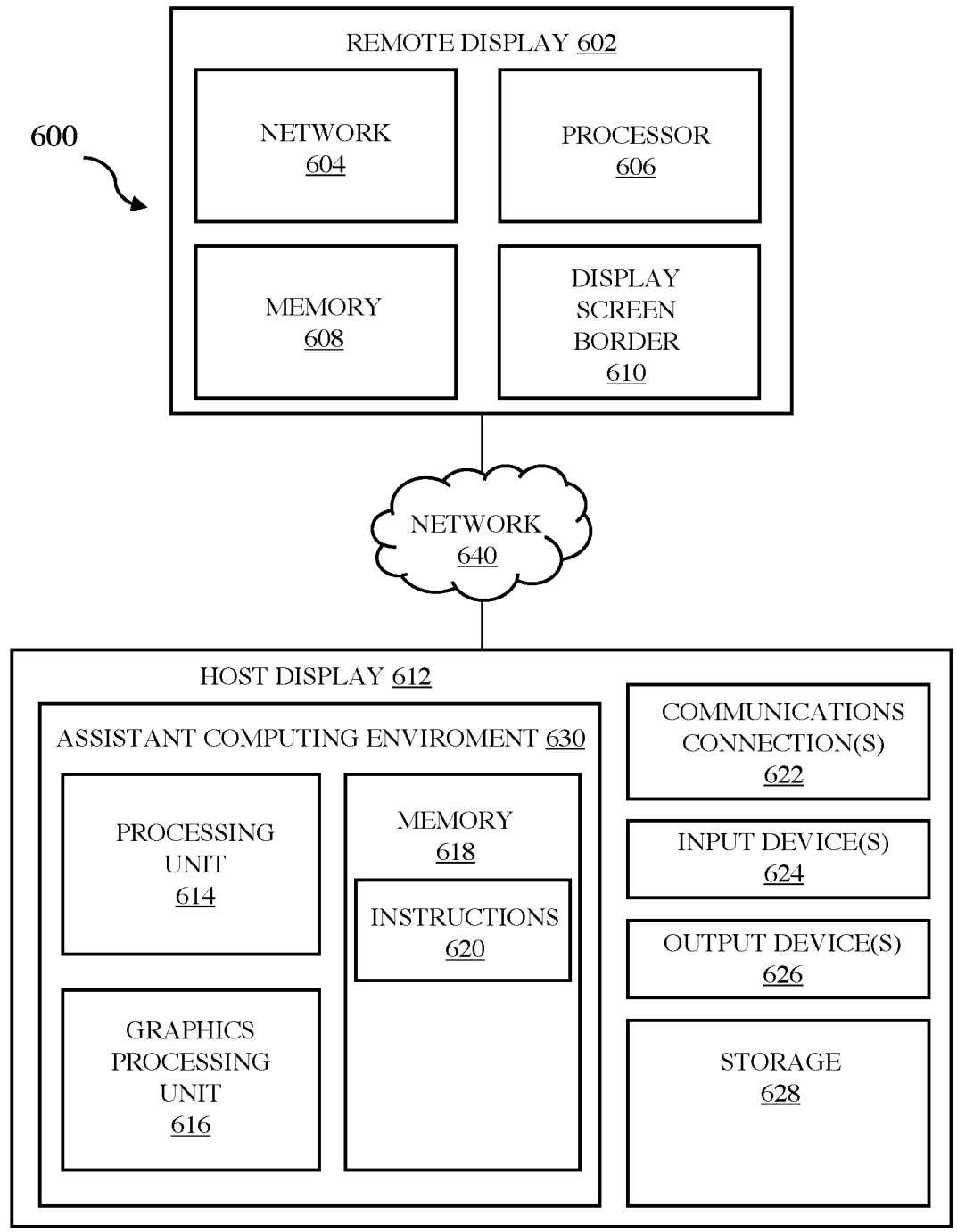
FIG. 6 illustrates a block diagram of an example computing environment, in accordance with embodiments of the present disclosure.

FIG. 6 depicts a block diagram of an example computing environment 600 in which embodiments of the present disclosure can be implemented. In some embodiments, aspects of computing environment 600 can perform the methods described in one or more of FIGS. 1-3 and utilize/generate one or more display screens in FIGS. 4A-4C, and FIG. 5. In the embodiment shown in FIG. 6, the computing environment 600 includes a remote display 602 and a host display 612.

According to embodiments, the host display 612 and the remote display 602 can be computer monitors. The remote display 602 and the host display 612 can include one or more processors 606 and 614 and one or more memories 608 and 618, respectively. The remote display 602 and the host display 612 can be configured to communicate with each other through an internal or external network interface 604 and communications connection(s) 622 (e.g., modems or interface cards). The remote display 602 and/or the host display 612 can be equipped to extend a user interface. Additionally, the remote display 602 and/or the host device 612 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote display 602 and/or the host display 612 can be desktops, laptops, televisions, or hand-held devices.

The remote display 602 and the host display 612 can be physically adjacent from each other and can communicate over a network 640. In embodiments, the host display 612 can be a central hub from which a remote display 602 and other remote display monitors (not pictured) can establish a communication connection, such as in a client-server networking model. In some embodiments, the host display 612 and remote display 602 can be configured in any other suitable network relationship (e.g., in a peer-to-peer configuration or using another network topology).

In embodiments, the network 640 can be implemented using any number of any suitable communications media. For example, the network 640 can be a wide area network (WAN), a local area network (LAN), the Internet, or an intranet. In certain embodiments, the remote display 602 and the host display 612 can be local to each other, and communicate via any appropriate local communication medium. For example, the remote system 602 and the host display 612 can communicate using a local area network (LAN), one or more hardwire connections, a wireless link or router, or an intranet. In some embodiments, the remote display 602, the host display 612, and any other devices can be communicatively coupled using a combination of one or more networks and/or one or more local connections. For example, the remote display 602 can be hardwired to the host display 612 (e.g., HDMI, cable, DVI cable, VGA cable, etc.) while a second device (not pictured) can communicate with the host device using the network 640 (e.g., over the Internet).

In some embodiments, the network 640 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 640.

In some embodiments, the host display 612 can include input device(s) 624 and output device(s) 626. The host display 612 can contain subcomponents, such as an assistant computing environment 630. The assistant computing environment 630 can include components for implementing the mouse movement assistant such as a processing unit 614, a graphics processing unit 616, and a memory 618. Memory 618 comprises instructions 620. In embodiments, instructions 620 can be executed by processing unit 614 to perform at least part of one or more of the operations discussed above with respect to FIGS. 1-3. The assistant computing environment 630 can be configured to perform processing to generate display screen border 610 from remote display 602. In various embodiments, display screen border 610 comprises generated partitioned and un-partitioned illuminated and highlighted display screen borders for pathways between screen-to-screen viewing. The storage 628 can be configured to store the display screen border 610, for further processing and/or future use.

While FIG. 6 illustrates a computing environment 600 with a single host display 612 and a single remote display 602, suitable computing environments for implementing embodiments of this disclosure can include any number of remote devices and host devices. The various models, modules, systems, instructions, and components illustrated in FIG. 6 can exist, if at all, across a plurality of host devices and remote devices.

It is noted that FIG. 6 is intended to depict representative components of an example computing environment 600. In some embodiments, however, individual components can have greater or lesser complexity than as represented in FIG. 6, components other than or in addition to those shown in FIG. 6 can be present, and the number, type, and configuration of such components can vary.

Figure 7:
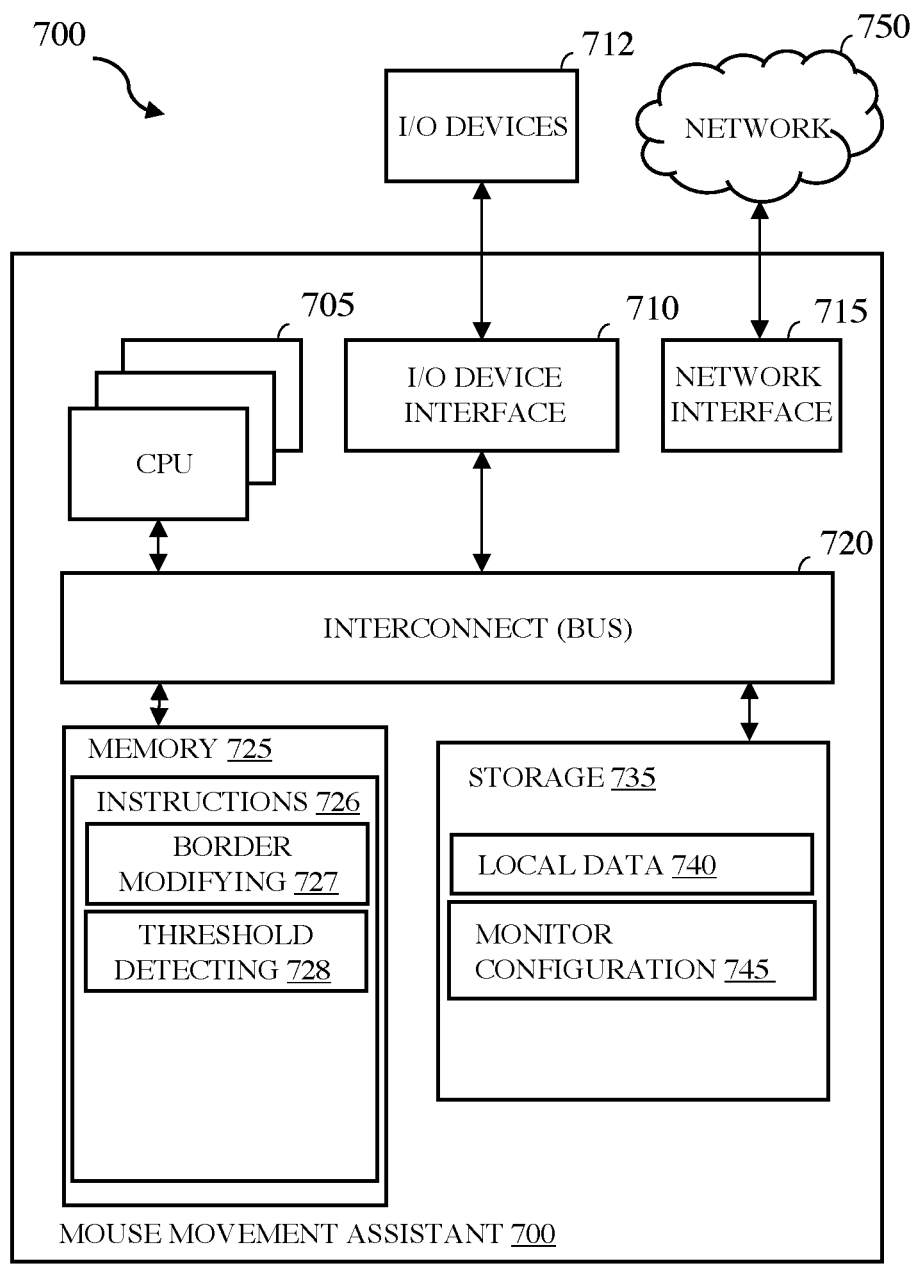
FIG. 7 illustrates a block diagram of an example system for a mouse movement assistant in accordance with some embodiments of the present disclosure.

FIG. 7 illustrates a block diagram of an example system 700 for a mouse movement assistant modifying a screen border boundary in accordance with some embodiments of the present disclosure. In some embodiments, mouse movement assistant 700 is a more detailed view of assistant computing environment 630 of FIG. 6. In some embodiments, mouse movement assistant 700 can implement any of the methods illustrated in FIGS. 1-3 and/or implement any of the diagrams illustrated in FIGS. 4A-4C and 5. The mouse movement assistant 700 includes a memory 725, storage 735, an interconnect (e.g., BUS) 720, one or more CPUs 705 (also referred to as processors 705 herein), an I/O device interface 710, I/O devices 712, and a network interface 715 coupled to a network 750.

Each CPU 705 retrieves and executes programming instructions stored in the memory 725 or storage 735. The interconnect 720 is used to move data, such as programming instructions, between the CPUs 705, I/O device interface 710, storage 735, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 735 is generally included to be representative of a non-volatile memory, such as a hard disk drive, solid state device (SSD), removable memory cards, optical storage, or flash memory devices. In an alternative embodiment, the storage 735 can be replaced by storage area-network (SAN) devices, the cloud, or other devices connected to the mouse movement assistant 700 via the I/O devices interface 710 or a network 750 via the network interface 715.

In some embodiments, the memory 725 stores instructions 726 and the storage 735 stores local data 740 and monitor configuration 745. However, in various embodiments, the instructions 726, local data 740 and monitor configuration 745 are stored partially in memory 725 and partially in storage 735, or they are stored entirely in memory 725 or entirely in storage 735, or they are accessed over the network 750 via the network interface 715.

Local data 740 can include a history of visually isolated display screen borders modified within the computing environment based on the monitor configuration 745. Monitor configuration 745 can include the location of each display screen monitor comprised in the computing environment.

The instructions 726 are processor executable instructions including border modifying instructions 727, and threshold detection instructions 728. Border modifying instructions 727 can be executed by mouse movement assistant 700 to modify one or more physically adjacent display screen border edge for enabled screen-to-screen mouse moving. Border modifying instructions 727 can be configured to perform, for example, operation 140 of FIG. 1.

Threshold detection instructions 728 can be executed by mouse movement assistant 700 to detect when the mouse pointer is within a pre-determined array of pixels from one or more display screen border. Threshold detection instructions 728 can be configured to perform portions of operation 130 of FIG. 1.

In various embodiments, the I/O devices 712 includes an interface capable of presenting information and receiving input. For example, I/O devices 712 can present information to a user (e.g., modified display screen border edge) interacting with mouse movement assistant 700. Mouse movement assistant 700 is connected to the network 750 via the network interface 715.

FIG. 7 is intended to represent illustrative components of an example mouse movement assistant 700 according to embodiments of the present disclosure. In some embodiments, however, individual components can have greater or lesser complexity than shown in FIG. 7, and components other than, or in addition to those shown in FIG. 7 can be present. Furthermore, in some embodiments, various components illustrated in FIG. 7 can have greater, lesser, or different functionality than shown in FIG. 7.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any subset of the functionality described with respect to FIGS. 1-7) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to improve a user's experience operating within a multiple monitor configuration, the method comprising:
   assigning a first color to a first display screen within a first monitor and a second color to a second display screen within a second monitor and a third color to a third display screen within a third monitor, wherein the second monitor is oriented adjacent the first monitor such that a first single edge of the first monitor aligns with a single edge of the second monitor and the third monitor is oriented adjacent the first monitor such that a second single edge of the first monitor aligns with a single edge of the third monitor;
   partitioning a first shared border edge of the first display screen along the first single edge and a second shared border edge of the first display screen along the second single edge;
   partitioning both a third and fourth border edge of the first display screen, wherein the third border edge is along a third single edge of the first monitor and the fourth border edge is along a fourth single edge of the first monitor;
   determining that a mouse pointer displayed on the first monitor approaches within a predetermined proximity of the first shared border edge on the first display screen; and
   causing, in response to the mouse pointer approaching within the predetermined proximity of the first shared border edge, each of the first and second and third and fourth border edges of the first monitor to appear in assigned colors including colors of adjacent monitors that the mouse pointer could pass through a respective border edge to enter into, including causing the first partitioned shared border edge to appear in the first display screen with the second color assigned to the second display screen and the second partitioned shared border edge to appear in the first display screen with the third color assigned to the third display screen.

2. The method of claim 1, wherein causing the third and fourth border edges of the first monitor to appear in assigned colors includes causing at least one of the third border edge or the fourth border edge of the first monitor to appear with a fourth color that represents a prohibited pathway for monitor-to-monitor crossing.

3. The method of claim 1, wherein the first shared border edge comprises a first border edge of the first monitor that is physically adjacent to a second border edge of the second monitor, wherein the first shared border edge is indicative of a permitted pathway for monitor-to-monitor crossing between the first monitor and second monitor.

4. The method of claim 1, further comprising:
   partitioning a first shared border edge of the second display screen that is adjacent the first single edge and partitioning a first shared border edge of the third display screen that is adjacent the second single edge; and
   causing, in response to the mouse pointer approaching within the predetermined proximity of the shared border edge, the first shared border edge of the second display screen to be displayed in the second color and the first shared border edge of the third display screen to be displayed in the third color.

5. The method of claim 1, further comprising:
   detecting that a length of the single edge of the first monitor that overlaps with the single edge of the second monitor is less than a height of the first display screen,
   wherein the partitioning the first shared border edge includes defining the first shared border edge to extend only the length of the single edge of the first display screen at only at which the single edge of the first monitor overlaps with the single edge of the second display screen in response to detecting that the length is less than the height of the first display screen.

6. The method of claim 1, wherein approaching within the predetermined proximity of the first shared border edge comprises moving within a first number of screen pixels from an edge of the first display screen.

7. The method of claim 1, further comprising:
   partitioning a first shared border edge of the second display screen;
   determining that the mouse pointer displayed on the second monitor approaches within a predetermined proximity of the first shared border edge on the second display screen; and
   causing, in response to the mouse pointer approaching within the predetermined proximity of the first shared border edge on the second display screen, the first partitioned shared border edge to appear in the second display screen with the first color assigned to the first display screen.

8. The method of claim 1, further comprising:
   highlighting, with the second color, a complete border of the second display screen in response to the mouse pointer passing through the shared border edge of the first display screen into the second display screen.

9. The method of claim 1, wherein each of the first and second and third and fourth border edges of the first monitor appearing in assigned colors in response to the mouse pointer approaching within the predetermined proximity of the first shared border edge includes substantially all border edges appearing in assigned colors.

10. A system to improve a user's experience operating within a multiple monitor configuration, the system comprising:
  a computer environment comprising a first monitor and a second monitor and third monitor, wherein the second monitor is oriented adjacent the first monitor such that a first single edge of the first monitor aligns with a single edge of the second monitor and the third monitor is oriented adjacent the first monitor such that a second single edge of the first monitor aligns with a single edge of the third monitor;
  a computer readable storage medium configured to store instructions; and
  a processor communicatively coupled to the computer readable storage medium and having a memory comprising instructions, which, when executed by the processor, cause the processor to:
    assign a first color to a first display screen within the first monitor and a second color to a second display screen within the second monitor and a third color to a third display screen within the third monitor;
    partition a first shared border edge of the first display screen along the first single edge and partition a second shared border edge of the first display screen on the first display screen along the second single edge;
    partition both a third and fourth border edge of the first display screen, wherein the third border edge is along a third single edge of the first monitor and the fourth border edge is along a fourth single edge of the first monitor;
    determine that a mouse pointer displayed on the first monitor approaches within a predetermined proximity of the shared border edge on the first display screen; and
    cause, in response to the mouse pointer approaching within the predetermined proximity of the first shared border edge, each of the first and second and third and fourth border edges of the first monitor to appear in assigned colors including colors of adjacent monitors that the mouse pointer could pass through a respective border edge to enter into, including causing the first partitioned shared border edge to appear in the first display screen with the second color assigned to the second display screen and the second partitioned shared border edge to appear in the first display screen with the third color assigned to the third display screen.

11. The system of claim 10, wherein causing the third and fourth border edges of the first monitor to appear in assigned colors includes causing at least one of the third border edge or the fourth border edge of the first monitor to appear with a fourth color that represents a prohibited pathway for monitor-to-monitor crossing.

12. The system of claim 10, wherein the first shared border edge comprises a first border edge of the first monitor that is physically adjacent to a second border edge of the second monitor, wherein the first shared border edge is indicative of a permitted pathway for monitor-to-monitor crossing between the first monitor and second monitor.

13. The system of claim 10, further comprising:
  partitioning a first shared border edge of the second display screen that is adjacent the first single edge and partitioning a first shared border edge of the third display screen that is adjacent the second single edge; and
  causing, in response to the mouse pointer approaching within the predetermined proximity of the shared border edge, the first shared border edge of the second display screen to be displayed in the second color and the first shared border edge of the third display screen to be displayed in the third color.

14. The system of claim 10, further comprising:
  detecting that a length of the single edge of the first monitor that overlaps with the single edge of the second monitor is less than a height of the first display screen,
  wherein the partitioning the first shared border edge includes defining the first shared border edge to extend only the length of the single edge of the first display screen at only at which the single edge of the first monitor overlaps with the single edge of the second display screen in response to detecting that the length is less than the height of the first display screen.

15. The system of claim 10, wherein approaching within the predetermined proximity of the first shared border edge comprises moving within a first number of screen pixels from an edge of the first display screen.

16. A computer program product to improve a user's experience operating within a multiple monitor configuration, the computer program product comprising a computer readable storage medium having program instructions embodied therewith, the program instructions executable by a processor to cause the processor to:
  assign a first color to a first display screen within a first monitor and a second color to a second display screen within a second monitor and a third color to a third display screen within a third monitor, wherein the second monitor is oriented adjacent the first monitor such that a single edge of the first monitor aligns with a single edge of the second monitor and the third monitor is oriented adjacent the first monitor such that a second single edge of the first monitor aligns with a single edge of the third monitor;
  partition a first shared border edge of the first display screen along the first single edge and a second shared border edge of the first display screen along the second single edge;
  partition both a third and fourth border edge of the first display screen, wherein the third border edge is along a third single edge of the first monitor and the fourth border edge is along a fourth single edge of the first monitor;
  determine that a mouse pointer displayed on the first monitor approaches within a predetermined proximity of the first shared border edge on the first display screen; and
  cause, in response to the mouse pointer approaching within the predetermined proximity of the first shared border edge, each of the first and second and third and fourth border edges of the first monitor to appear in assigned colors including colors of adjacent monitors that the mouse pointer could pass through a respective border edge to enter into, including causing the first partitioned shared border edge to appear in the first display screen with the second color assigned to the second display screen and the second partitioned shared border edge to appear in the first display screen with the third color assigned to the third display screen.

17. The computer program product of claim 16,
  wherein causing the third and fourth border edges of the first monitor to appear in assigned colors includes causing at least one of the third border edge or the fourth border edge of the first monitor to appear with a fourth color that represents a prohibited pathway for monitor-to-monitor crossing.

18. The computer program product of claim 16, wherein the first shared border edge comprises a first border edge of the first monitor that is physically adjacent to a second border edge of the second monitor, wherein the first shared border edge is indicative of a permitted pathway for monitor-to-monitor crossing between the first monitor and second monitor.

19. The computer program product of claim 16, further comprising:
   partitioning a first shared border edge of the second display screen that is adjacent the first single edge and partitioning a first shared border edge of the third display screen that is adjacent the second single edge; and
   causing, in response to the mouse pointer approaching within the predetermined proximity of the shared border edge, the first shared border edge of the second display screen to be displayed in the second color and the first shared border edge of the third display screen to be displayed in the third color.

20. The computer program product of claim 16, further comprising:
   detecting that a length of the single edge of the first monitor that overlaps with the single edge of the second monitor is less than a height of the first display screen,
   wherein the partitioning the first shared border edge includes defining the first shared border edge to extend only the length of the single edge of the first display screen at only at which the single edge of the first monitor overlaps with the single edge of the second display screen in response to detecting that the length is less than the height of the first display screen.

* * * * *